US009377774B2

(12) United States Patent
Tajima

(10) Patent No.: US 9,377,774 B2
(45) Date of Patent: Jun. 28, 2016

(54) CONTROLLER FOR MACHINE TOOL INCLUDING MAIN SHAFTS

(71) Applicant: FANUC Corporation, Yamanashi (JP)

(72) Inventor: Daisuke Tajima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 32 days.

(21) Appl. No.: 14/462,281

(22) Filed: Aug. 18, 2014

(65) Prior Publication Data

US 2015/0054444 A1 Feb. 26, 2015

(30) Foreign Application Priority Data

Aug. 22, 2013 (JP) ................................ 2013-172453

(51) Int. Cl.
*H02P 27/04* (2006.01)
*G05B 19/406* (2006.01)

(52) U.S. Cl.
CPC .... *G05B 19/406* (2013.01); *G05B 2219/34434* (2013.01); *G05B 2219/50081* (2013.01); *G05B 2219/50083* (2013.01)

(58) Field of Classification Search
CPC .... G05B 19/408; G05B 19/231; G05B 19/19; H02P 27/08; H02P 21/085
USPC .......................... 318/569, 600, 801, 802, 806
See application file for complete search history.

(56) References Cited

U.S. PATENT DOCUMENTS

| | | | | |
|---|---|---|---|---|
| 5,241,255 A * | 8/1993 | Oshima | ................... | B66B 5/027 187/289 |
| 5,777,450 A * | 7/1998 | Kono | ................... | G05B 19/406 318/568.11 |
| 8,030,878 B2 * | 10/2011 | Iwashita | ................ | G01R 31/42 318/779 |
| 2004/0153199 A1 | 8/2004 | Sagasaki et al. | | |
| 2011/0182398 A1 * | 7/2011 | Iwashita | ................ | G01R 31/42 377/19 |
| 2011/0234141 A1 * | 9/2011 | Kataoka | ............... | G05B 19/406 318/563 |
| 2013/0113411 A1 * | 5/2013 | Suzuki | ...................... | H02P 3/22 318/681 |
| 2013/0134910 A1 * | 5/2013 | Iwashita | ................... | H02P 3/14 318/376 |

FOREIGN PATENT DOCUMENTS

| | | |
|---|---|---|
| CN | 101500736 A | 8/2009 |
| CN | 102027426 A | 4/2011 |
| CN | 102205512 A | 10/2011 |
| DE | 4306307 C2 | 8/1997 |
| JP | 6-131022 A | 5/1994 |
| JP | 8-112701 A | 5/1996 |
| JP | 2001-105209 A | 4/2001 |
| JP | 3644129 B2 | 4/2005 |
| JP | 4098748 B2 | 6/2008 |

* cited by examiner

*Primary Examiner* — Rina Duda
(74) *Attorney, Agent, or Firm* — Hauptman Ham, LLP

(57) ABSTRACT

A controller for a machine tool includes a converter converting AC power on the power supply side to DC power, a feed-shaft motor inverter converting DC power on a DC link side and AC power on a feed shaft motor side, first and second main-shaft-motor inverters converting DC power on the DC link side and AC power on first and second main shaft motors side, a power failure detection unit detecting a power failure on the power supply side, a voltage detection unit detecting a DC link voltage value, a feed-shaft-motor command unit outputting a deceleration command to the feed-shaft-motor inverter upon a power failure, and a main-shaft-motor command unit outputting an acceleration/deceleration command to the first main-shaft-motor inverter in accordance with the DC link voltage value and a power shutoff command to the second-main-shaft-motor inverter upon a power failure.

12 Claims, 6 Drawing Sheets

CONTROLLER FOR MACHINE TOOL INCLUDING MAIN SHAFTS

RELATED APPLICATIONS

The present application claims priority to Japanese Application Number 2013-172453, filed Aug. 22, 2013, the disclosure of which is hereby incorporated by reference herein in its entirety.

BACKGROUND OF THE INVENTION

1. Field of the Invention

The present invention relates to a controller for a machine tool including a feed shaft motor driving a feed shaft and main shaft motors driving main shafts and, in particular, to a controller that implements power failure protection for a machine tool including two main shafts moving in synchronization with each other through a workpiece held by the main shafts.

2. Description of the Related Art

In many machine tools including a feed shaft motor and a main shaft motor, the main shaft is used as a drive source for driving a main shaft to which a workpiece or a tool (any of various types of tools), for example, is attached and the feed shaft motor is used as a driving source for driving a feed shaft that moves the main shaft, for example. In a motor controller for such a machine tool, AC power input from an AC input side is first converted to DC power, then further converted to AC power, which is then used as drive power for driving the motors each of which is provided for each of the shaft. Such a machine tool is equipped with, as main circuits of a motor controller, a converter which converts (rectifies) AC power supplied from the AC power supply side at which a three-phase AC input power supply is located and outputs DC power and inverters which are connected to a DC link (direct-current link), which is the DC side of the converter, and interconverts DC power from the DC link and AC power which is drive power for driving the motors or regenerative power generated by the motors. The controller controls an AC output from each of the inverters to a desired voltage and a desired frequency to control the speed, torque or rotor position of each of the main shaft motor and the feed shaft motor connected to the AC side of each inverter.

The inverter is provided for each of the motors which drive multiple driving shafts (the feed shaft and the main shaft). Because of a demand for energy saving, regenerative inverters are often used to store regenerative power generated during motor deceleration in an electric storage device provided on the DC link and reuse the regenerative power as power for driving the motors or provide the power back to the AC power supply side.

Due to a demand for energy saving as with the inverters, a regenerative converter is sometimes used that is capable of providing regenerative energy generated during motor deceleration back to the AC power supply side.

When a power failure occurs on the AC power supply side of the converter of the motor controller described above, the feed shaft motor and the main shaft motor in the motor controller may not continue proper operation. In that case, a collision of the feed shaft can cause some problems such as damage or deformation of a motor, the motor controller that drives the motor, a tool connected to the motor driven by the motor controller, a workpiece to be machined with the tool, the manufacturing line that includes the motor controller, or other equipment.

To prevent a collision of the feed shaft due to a power failure on the AC power supply side, operation of the feed shaft motor that drives the feed shaft needs to be stopped as soon as possible. For that purpose, a power failure determination unit is provided on the AC power supply side of the converter to monitor a power failure on the AC power supply side and, when a power failure occurs, a deceleration command is provided to the feed shaft motor to stop the feed shaft motor, thereby avoiding or minimizing the kind of problem described above to protect the main shaft moved by the feed shaft motor and a tool connected to the main shaft or a workpiece to be machined by the tool. When the power supply for a computer unit of the controller is backed up by an uninterruptible power source device (UPS) or the like, even when a power failure occurs on the AC power supply side, the controller can provide a command to the inverter for the feed shaft motor to cause an action to be taken in a time of emergency, the inverter for the feed shaft motor can be kept operating for a while with charge stored in a capacitor provided in the converter and the feed shaft motor can be immediately stopped.

However, when a deceleration command is provided to the feed shaft motor in response to detection of a power failure on the AC power supply side to immediately stop the feed shaft motor, the regenerative power may not be provided back to the AC power supply side during the power failure and, as a result, DC voltage on the DC link between the converter and the inverters will increase. This is especially remarkable when regenerative power of the motor is large. To address the problem, when DC voltage on the DC link, which is the DC side of the inverter, excessively increases, the inverter typically issues an "overvoltage alarm" in order to protect the inverter itself and discontinues control.

Depending on characteristics of the feed shaft motor or the degree of friction on the feed shaft driven by the feed shaft motor, the feed-shaft-motor inverter needs to continue supplying drive power to the feed shaft motor even when the feed shaft motor is to be decelerated. In other words, in this case, since regenerative power is not generated in the feed shaft motor, the feed-shaft-motor inverter does not supply energy to the DC link but, on the contrary, the feed-shaft-motor inverter converts DC power from the DC link to AC power and supplies the AC power to the feed shaft motor even though the feed shaft motor is decelerated. In such a situation, when a power failure occurs on the AC power supply side and a deceleration command for emergency stop is provided as described above, the DC voltage on the DC link would rapidly decreases. When the DC voltage on the DC link, which is on the DC side of the inverter, excessively decreases, the inverter usually may not supply drive power and therefore issues a "low-voltage alarm" to discontinue control.

To avoid occurrence of such an "overvoltage alarm" and "low-voltage alarm" which would occur due to variations in DC voltage on the DC link caused by deceleration of the feed shaft motor, in some cases the DC voltage on the DC link is monitored and, when the DC voltage increases, the main shaft motor is accelerated to consume the increase in the DC power on the DC link which has caused the increase in the DC voltage on the DC link to hold down the increase in the DC voltage; on the other hand, when the DC voltage on the DC link drops, the main shaft motor is decelerated to produce regenerative power to compensate for the decrease in the DC power on the DC link which has caused the DC voltage drop on the DC link to suppress the decrease in the DC power on the DC link. Hereinafter, the operation of suppressing variations in the DC power on the DC link by accelerating or decelerating the main shaft motor depending on a DC voltage value on the DC link in the event of a power failure is referred to as the "power failure backup operation". Since the power failure backup operation can suppress variations in the DC voltage values on the DC link even when the operation of the feed shaft motor which drives the feed shaft is quickly stopped in order to prevent a collision of the feed shaft in the event of a power failure on the AC power supply side, occurrence of an "overvoltage alarm" and a "low-voltage alarm" can be avoided.

In a machine tool that includes multiple main shafts and two of the main shafts hold one workpiece, the two main shafts are coupled together through the held workpiece so that they can move in concert with each other. In this case, when a power failure occurs on the AC power supply side of the converter of the motor controller, the synchronization between the two main shafts maintained by the held workpiece is lost and the main shafts independently decelerate to stop, which may twist the workpiece resulting breaking or deforming the workpiece.

To avoid such a twist of a workpiece, there is a technique that when a power failure occurs on the AC power supply side of a machine tool in which two main shafts are coupled by holding a workpiece, a chuck of one of the main shafts that have held the workpiece is loosen and the workpiece is held only by the other main shaft while the two main shafts are decelerated to stop, thereby preventing the workpiece from twisting, as described in Japanese Laid-open Patent Publication No. 2001-105209, for example.

When the power-failure backup operation described above is applied to two main shafts that are coupled through a held workpiece and move in concert with each other in a machine tool that includes multiple main shafts, two of which hold one workpiece, the two main shafts move in synchronization with each other through the held workpiece and the synchronization is maintained before occurrence of a power failure on the AC power supply side (i.e., during a normal operation) but once a power failure occurs, the two main shafts would independently perform power failure backup operations. The power failure backup operations performed independently by the two main shafts make a difference in the conditions of acceleration/deceleration operations of the main shaft motors, which causes the synchronization between the two main shafts maintained by the held workpiece to be lost to twist the workpiece, thereby causing a problem such as breakage or deformation.

To avoid a twist of a workpiece in a machine tool to which such a power failure backup operation is applied, the invention described in Japanese Laid-open Patent Publication No. 2001-105209 may be further applied. However, the operation of loosening the chuck of one of the main shafts in a power failure needs to be completed instantaneously and a mechanical arrangement for accomplishing such an operation would be complicated. Additionally, in a power failure, control would be needed to be performed for both of the power-failure backup operation and the operation of loosening the chuck of one of the main shafts, which inevitably adds to complexity of the control system.

SUMMARY OF THE INVENTION

In light of the problems described above, an object of the present invention is to provide a controller for a machine tool that includes a feed shaft motor driving a feed shaft and main shaft motors driving main shafts that hold a workpiece, and that is capable of reliably and quickly stopping the feed shaft motor and preventing damage to the workpiece held by the main shafts in the event of a power failure on an AC power supply side.

To achieve the object, a controller for a machine tool including a feed shaft motor driving a feed shaft, a first main shaft motor driving a first main shaft, and a second main shaft motor driving a second main shaft includes a converter inter-converting AC power on an AC power supply side and DC power on a DC link which is a DC side, a feed-shaft-motor inverter connected to the DC link, the feed-shaft-motor inverter interconverting DC power on the DC link and AC power which is drive power or regenerative power of the feed shaft motor, a first-main-shaft-motor inverter and a second-main-shaft-motor inverter connected to the DC link, the first-main-shaft-motor inverter and the second-main-shaft-motor inverter interconverting DC power on the DC link and AC power which is drive power or regenerative power for each of the first main shaft motor and the second main shaft motor, a power failure detection unit detecting whether or not there is a power failure on the AC power supply side of the converter, a voltage detection unit detecting a DC voltage value on the DC link, a feed-shaft-motor command unit outputting a command controlling power interconversion of the feed-shaft-motor inverter so as to decelerate the feed shaft motor when the power failure detection unit detects a power failure, and a main-shaft-motor command unit outputting a first-main-shaft-motor acceleration/deceleration command controlling power interconversion of the first-main-shaft-motor inverter so as to accelerate or decelerate the first main shaft motor in accordance with a DC voltage value detected by the voltage detection unit and a power shutoff command controlling power interconversion of the second-main-shaft-motor inverter so as to shut off drive power to the second main shaft motor, when the power failure detection unit detects a power failure.

The controller for a machine tool may further include a state signal receiving unit receiving a state signal indicating that the first main shaft and the second main shaft are in a coupled state in which the first main shaft and the second main shaft are coupled together and move in concert with each other or are in a decoupled state in which the first main shaft and the second main shaft are decoupled and move independently of each other, wherein when the power failure detection unit detects a power failure while the state signal indicates the coupled state, the main-shaft-motor command unit may output the first-main-shaft-motor acceleration/deceleration command to the first-main-shaft-motor inverter and the power shutoff command to the second-main-shaft-motor inverter, and when the power failure detection unit detects a power failure while the state signal indicates the decoupled state, the main-shaft-motor command unit may output the first-main-shaft-motor acceleration/deceleration command to the first-main-shaft-motor inverter and a second-main-shaft-motor acceleration/deceleration command, instead of the power shutoff command, to the second-main-shaft-motor inverter, the second-main-shaft-motor acceleration/deceleration command controlling power interconversion of the second-main-shaft-motor inverter so as to accelerate or decelerate the second main shaft motor in accordance with a DC voltage value detected by the voltage detection unit.

Further, when the power failure detection unit detects a power failure, the main-shaft-motor command unit may output, as the first-main-shaft-motor acceleration/deceleration command, an acceleration command that controls power interconversion of the first-main-shaft-motor inverter so as to accelerate the first main shaft motor when a DC voltage value detected by the voltage detection unit is greater than a predetermined upper limit and, may output, as the first-main-shaft-motor acceleration/deceleration command, a deceleration command that controls power interconversion of the first main-shaft-motor inverter so as to decelerate the first main shaft motor when the DC voltage value detected by the voltage detection unit is smaller than a predetermined lower limit, the predetermined lower limit being smaller than the predetermined upper limit.

Moreover, when the power failure detection unit detects a power failure while the state signal indicates the decoupled state, the main-shaft-motor command unit may output, as the second-main-shaft-motor acceleration/deceleration command, an acceleration command that controls power interconversion of the second-main-shaft-motor inverter so as to accelerate the second main shaft motor when a DC voltage value detected by the voltage detection unit is greater than a predetermined upper limit and may output, as the second-main-shaft-motor acceleration/deceleration command, a deceleration command that controls power interconversion of the second-main-shaft-motor inverter so as to decelerate the second main shaft motor when a DC voltage value detected by the voltage detection unit is smaller than a predetermined lower limit, the predetermined lower limit being smaller than the predetermined upper limit.

The main-shaft-motor command unit may be provided in a computer numerical control unit outputting operation commands to the feed shaft motor, the first main shaft motor and the second main shaft motor.

Alternatively, the main-shaft-motor command unit may be separately provided in a first-main-shaft-motor-inverter control unit controlling power interconversion of the first main-shaft-motor inverter and in a second-main-shaft-motor-inverter control unit controlling power interconversion of the second main-shaft-motor inverter.

The state signal receiving unit may be provided in the computer numerical control unit outputting operation commands to the feed shaft motor, the first main shaft motor and the second main shaft motor.

The controller may further include a power supply backup unit supplying drive power to a feed-shaft-motor-inverter control unit controlling power interconversion of the feed-shaft-motor inverter, a first-main-shaft-motor-inverter control unit controlling power interconversion of the first-main-shaft-motor inverter, and a second-main-shaft-motor-inverter control unit controlling power interconversion of the second main-shaft-motor inverter, when the power failure detection unit detects a power failure.

BRIEF DESCRIPTION OF DRAWINGS

The present invention will be better understood by referring to the following accompanying drawings in which.

DETAILED DESCRIPTION

Figure 1:
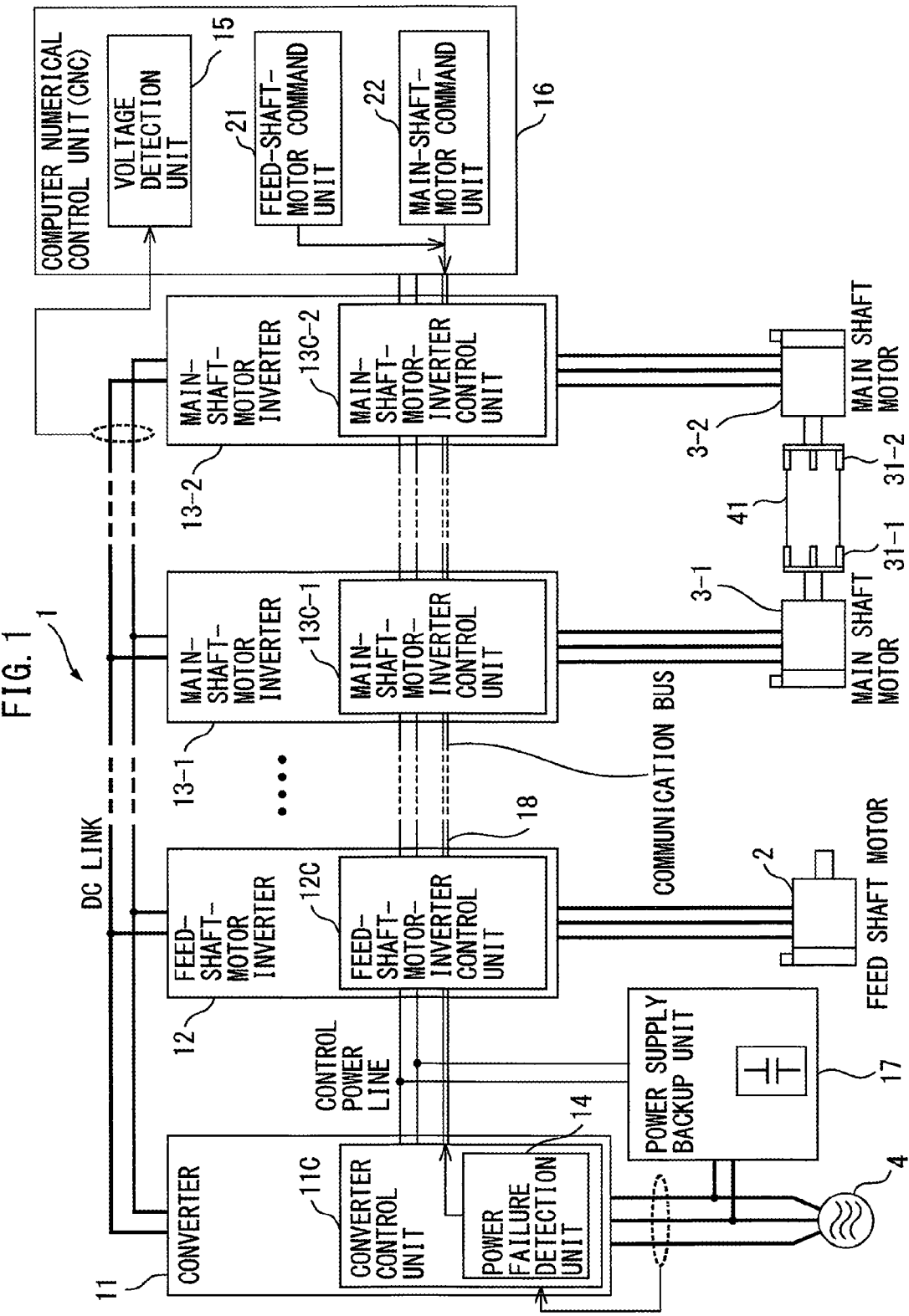
FIG. 1 is a block diagram illustrating a machine tool controller according to a first embodiment.

Controllers for a machine tool including main shafts will be described below with reference to the drawings. However, it should be understood that the present invention is not limited to the embodiments illustrated in the drawings or described below.

FIG. 1 is a block diagram illustrating a machine tool controller according to a first embodiment. Hereinafter, components labeled with like reference numerals in different drawings represent components having like functions unless otherwise stated.

According to the first embodiment, a controller 1 for a machine tool including a feed shaft motor 2 which drives a feed shaft and main shaft motors 3-1 and 3-2 which drive main shafts includes a converter 11, a feed-shaft-motor inverter 12, a first-main-shaft-motor inverter 13-1, a second-main-shaft-motor inverter 13-2, a power failure detection unit 14, a voltage detection unit 15, a computer numerical control unit (CNC) 16 functioning as a control unit, a power supply backup unit 17, a communication bus 18 functioning as a communication unit, a feed-shaft-motor command unit 21, and a main-shaft-motor command unit 22. In the first embodiment, the feed-shaft-motor command unit 21 and the main-shaft-motor command unit 22 are provided in the computer numerical control unit 16. Note that the feed shaft motor 2 depicted is merely an illustrative example and the number of feed shaft motors 2 does not limit the present invention. Furthermore, while two main shaft motors 3-1 and 3-2 are depicted, there may be more than two main shaft motors.

The converter 11, the feed-shaft-motor inverter 12, the first-main-shaft-motor inverter 13-1, and the second-main-shaft-motor inverter 13-2 are interconnected through a DC link. The communication bus 18, which is a communication unit, includes the function of communicatively interconnecting a converter control unit 11C provided in the converter 11, a feed-shaft-motor-inverter control unit 12C provided in the feed-shaft-motor inverter 12, a first-main-shaft-motor-inverter control unit 13C provided in the first-main-shaft-motor inverter 13-1, a second-main-shaft-motor-inverter control unit 13C-2 provided in the second-main-shaft-motor inverter 13-2, and the computer numerical control unit 16. Note that while the communication unit is implemented by a wire transmission system like the communication bus 18 in this embodiment, alternatively, the communication unit may be implemented by a wireless system using radio or infrared transmission for example.

The converter 11 is a converter capable of rectifying AC power supplied from a commercial three-phase AC power supply 4, outputting DC power during power driving and providing regenerative energy regenerated by a motor back to the AC power supply 4 side through the DC link during regeneration. In other words, the converter 11 interconverts AC voltage on the commercial three-phase AC power supply 4 side and DC voltage on the DC link, which is the DC side. Examples of the converter 11 include a 120-degree conduction rectifying circuit and a PWM-controlled rectifying circuit.

The feed-shaft-motor inverter 12 includes a conversion circuit (not depicted) such as a PWM inverter, for example, that includes an internal switching device and a feed-shaft-motor-inverter control unit 12C that controls the conversion circuit. Based on a motor drive command received from the computer numerical control unit 16 through the communication bus 18, the feed-shaft-motor-inverter control unit 12C in the feed-shaft-motor inverter 12 causes the switching device in the conversion circuit to switch to convert DC power supplied from the DC link side to three-phase AC power with a desired voltage and a desired frequency for driving the feed shaft motor 2. The feed shaft motor 2 operates based on the voltage-variable frequency-variable three-phase AC power supplied. Based on a motor drive command received from the computer numerical control unit 16 through the communication bus 18, the feed-shaft-motor-inverter control unit 12C causes the switching device in the conversion circuit to switch to convert AC power, which is regenerative power generated during deceleration of the feed shaft motor 2 to DC power and provides the DC power back to the DC link. In this way, the feed-shaft-motor inverter 12 interconverts DC power on the DC link and AC power which is drive power for feed shaft motor 2 or regenerative power.

The first-main-shaft-motor inverter 13-1 includes a conversion circuit (not depicted) such as a PWM inverter, for example, that includes an internal switching device and a first-main-shaft-motor-inverter control unit 13C-1 that controls the conversion circuit. Based on a motor drive command received from the computer numerical control unit 16 through the communication bus 18, the first-main-shaft-motor-inverter control unit 13C-1 in the first main-shaft-motor inverter 13-1 causes the switching device in the conversion circuit to switch to convert DC power supplied from the DC link side to three-phase AC power with a desired voltage and a desired frequency for driving the first main shaft motor 3-1. The first main shaft motor 3-1 operates on the basis of the variable-voltage variable-frequency three-phase AC power supplied. Furthermore, based on a motor drive command received from the computer numerical control unit 16 through the communication bus 18, the first-main-shaft-motor-inverter control unit 13C-1 causes the switching device in the conversion circuit to convert AC power which is regenerative power generated during deceleration of the first main shaft motor 3-1 to DC power and provides the DC power back to the DC link. In this way, the first-main-shaft-motor inverter 13-1 interconverts DC power on the DC link and AC power which is drive power for the first main shaft motor 3-1 or regenerative power.

Similarly, the second-main-shaft-motor inverter 13-2 includes a conversion circuit (not depicted) such as a PWM inverter, for example, that includes an internal switching device and a second-main-shaft-motor-inverter control unit 13C-2 that controls the conversion circuit. Based on a motor drive command received from the computer numerical control unit 16 through the communication bus 18, the second-main-shaft-motor-inverter control unit 13C-2 in the second main-shaft-motor inverter 13-2 causes the switching device in the conversion circuit to switch to convert DC power supplied from the DC link side to three-phase AC power with a desired voltage and a desired frequency for driving the second main shaft motor 3-2. The second main shaft motor 3-2 operates on the basis of the variable-voltage variable-frequency three-phase AC power supplied. Based on a motor drive command received from the computer numerical control unit 16 through the communication bus 18, the second-main-shaft-motor-inverter control unit 13C-2 causes the switching device in the conversion circuit to switch to convert AC power which is regenerative power generated during deceleration of the second main shaft motor 3-2 to DC power and provides the DC power back to the DC link. In this way, the second-main-shaft-motor inverter 13-2 interconverts DC power on the DC link and AC power which is drive power for the second main shaft motor 3-2 or regenerative power.

Chuckers 31-1 and 31-2 for holding a workpiece 41 are provided on the main shaft driven by the first main shaft motor 3-1 and the main shaft driven by the second main shaft motor 3-2, respectively. The workpiece 41 is held by the chuckers 31-1 and 31-2 by being sandwiched and clamped between the chuckers 31-1 and 31-2. When the workpiece 41 is held by the chuckers 31-1 and 31-2, the first main shaft and the second main shaft are placed in a coupled state in which the first main shaft and second main shaft are coupled together through the workpiece 41 and move in concert with each other.

The power failure detection unit 14 is provided inside the converter control unit 11C, for example, and detects whether or not there is a power failure on the AC power supply 4 side of the converter 11. Detection of whether there is a power failure or not by the power failure detection unit 14 may be implemented by a well-known method using a variation in an AC voltage value, an AC current value, or an AC frequency on the AC power supply 4 side of the converter 11. The converter control unit 11C provides the result of detection of whether or not there is a power failure by the power failure detection unit 14 to the feed-shaft-motor-inverter control unit 12C, the first-main-shaft-motor-inverter control unit 13C-1, the second-main-shaft-motor-inverter control unit 13C-2, and the computer numerical control unit 16, through the communication bus 18.

The voltage detection unit 15 is provided inside the computer numerical control unit 16 and detects a DC voltage value on the DC link. Alternatively, the voltage detection unit 15 may be provided in the feed-shaft-motor-inverter control unit 12C, the first-main-shaft-motor-inverter control unit 13C-1, or the second-main-shaft-motor-inverter control unit 13C-2, for example. In that case, a detected DC voltage value on the DC link may be provided to the computer numerical control unit 16 through the communication bus 18.

The computer numerical control unit 16 is configured to generate and output motor drive commands for controlling power interconversion of the feed-shaft-motor inverter 12, the first-main-shaft-motor inverter 13-1, and the second-main-shaft-motor inverter 13-2 in order to rotate the feed shaft motor 2, the first main shaft motor 3-1 and the second main shaft motor 3-2 at desired rotation speeds and rotation torques appropriate for the machine tool or to control the positions of the rotors. In other words, the computer numerical control unit 16 uses feedback control (which may also include feedforward control) for the rotation speeds and the positions of the rotors of the feed shaft motor 2, the first main shaft motor 3-1 and the second main shaft motor 3-2 and various motor constants, motor inertia, and motor friction of the feed shaft motor 2, the first main shaft motor 3-1 and the second main shaft motor 3-2 and parameters such as inertia and friction of the feed shaft driven by the feed shaft motor 2 and the main shafts driven by the first main shaft motor 3-1 and the second main shaft motor 3-2 to generate motor drive commands for each of the motors according to an operation program for the machine tool. The generated motor drive commands are provided to the feed-shaft-motor-inverter control unit 12C, the first-main-shaft-motor-inverter control unit 13C-1 and the second-main-shaft-motor-inverter control unit 13C-2 through the communication bus 18. The feed-shaft-motor-inverter control unit 12C, the first-main-shaft-motor-inverter control unit 13C-1 and the second-main-shaft-motor-inverter control unit 13C-2 cause the switching device in the conversion circuits in the feed-shaft-motor inverter 12, the first-main-shaft-motor inverter 13-1 and the second-main-shaft-motor inverter 13-2, respectively, to switch in accordance with the received motor drive commands, thereby controlling power interconversion of the feed-shaft-motor inverter 12, the first-main-shaft-motor inverter 13-1 and the second-main-shaft-motor inverter 13-2. In this way, the computer numerical control unit 16 acts as a master control unit for the feed-shaft-motor-inverter control unit 12C, the first-main-shaft-motor-inverter control unit 13C-1 and the second-main-shaft-motor-inverter control unit 13C-2.

When a workpiece 41 is machined during a normal operation where there is not a power failure on the AC power supply 4 side, the computer numerical control unit 16 generates a motor drive command that causes the first main shaft motor 3-1 driving the first main shaft on which the chucker 31-1 is provided and the second main shaft motor 3-2 driving the second main shaft on which the chucker 31-2 is provided to rotate in synchronization with each other so that the workpiece 41 held by the chuckers 31-1 and 31-2 does not twist. The generated motor drive command is provided to the first-main-shaft-motor-inverter control unit 13C-1 and the second-main-shaft-motor-inverter control unit 13C-2 through the communication bus 18. Based on the motor drive command, the first-main-shaft-motor-inverter control unit 13C-1 and the second-main-shaft-motor-inverter control unit 13C-2 convert DC power on the DC link to AC drive power for causing the first main-shaft-motor 3-1 and the second main-shaft-motor 3-2 to rotate in synchronization and output the AC drive power.

In the first embodiment, the computer numerical control unit 16 includes a feed-shaft-motor command unit 21 and a main-shaft-motor command unit 22.

When the feed-shaft-motor command unit 21 in the computer numerical control unit 16 receives a notification of occurrence of a power failure on the AC power supply 4 side from the power failure detection unit 14 through the communication bus 18, the feed-shaft-motor command unit 21 generates a feed-shaft-motor deceleration command for controlling power interconversion by the feed-shaft-motor inverter 12 to decelerate the feed shaft motor 2. The generated feed-shaft-motor deceleration command is output to the feed-shaft-motor-inverter control unit 12C through the communication bus 18. When the feed-shaft-motor-inverter control unit 12C receives the feed-shaft-motor deceleration command, the feed-shaft-motor-inverter control unit 12C controls the switching device in the conversion circuit of the feed-shaft-motor inverter 12 to cause the feed shaft motor 2 to produce deceleration torque. In this way, when the power failure detection unit 14 detects a power failure, the feed-shaft-motor command unit 21 commands the feed-shaft-motor inverter 12 to perform power interconversion that decelerates the feed shaft motor 2, so that the feed shaft motor 2 decelerates to stop.

When the main-shaft-motor command unit 22 in the computer numerical control unit 16 receives a notification of occurrence of a power failure on the AC power supply 4 side from the power failure detection unit 14 through the communication bus 18, the main-shaft-motor command unit 22 generates a first main-shaft-motor acceleration/deceleration command that controls power interconversion of the first main-shaft motor inverter 13-1 to accelerate or decelerate the first main shaft motor 3-1 in accordance with a DC voltage value detected by the voltage detection unit 15 and a power shutoff command that controls power interconversion of the second-main-shaft-motor inverter 13-2 so as to shut off drive power to the second main shaft motor 3-2. In other words, when the power failure detection unit 14 detects a power failure, the main-shaft-motor command unit 22 commands the first main-shaft-motor inverter 13-1 to perform power interconversion that accelerates or decelerates the first main shaft motor 3-1 in accordance with a DC voltage value detected by the voltage detection unit 15 and commands the second-main-shaft-motor inverter 13-2 to perform power interconversion that shuts off drive power to the second main shaft motor 3-2.

The first main-shaft-motor acceleration/deceleration command for the first-main-shaft-motor inverter 13-1 will be described below in further detail. When the power failure detection unit 14 detects a power failure, the main-shaft-motor command unit 22 generates, as the first main-shaft-motor acceleration/deceleration command, an acceleration command that controls the power interconversion of the first-main-shaft-motor inverter 13-1 to accelerate the first main shaft motor 3-1 when the DC voltage value detected by the voltage detection unit 15 is greater than a predetermined upper limit, or generates a deceleration command that controls the power interconversion of the first-main-shaft-motor inverter 13-1 to decelerate the first main-shaft-motor 3-1 when the DC voltage value detected by the voltage detection unit 15 is smaller than a predetermined lower limit. The predetermined lower limit is smaller than the predetermined upper limit. Note that in an alternative variation, when the DC voltage value detected by the voltage detection unit 15 is greater than or equal to the predetermined lower limit and less than or equal to the predetermined upper limit, the main-shaft-motor command unit 22 may generate a command that controls power interconversion of the first-main-shaft-motor inverter 13-1 to maintain the current speed and may output the command to the first-main-shaft-motor-inverter control unit 13C-1 through the communication bus 18. In this case, control is performed so that the current speed of the main shaft is maintained as long as the DC voltage does not increase or drop.

When the first-main-shaft-motor-inverter control unit 13C-1 receives a first main-shaft-motor acceleration/deceleration command generated by the main-shaft-motor command unit 22 through the communication bus 18, the first-main-shaft-motor-inverter control unit 13C-1 performs a "power failure backup operation". In particular, when the first-main-shaft-motor-inverter control unit 13C-1 receives a deceleration command as the first main-shaft-motor acceleration/deceleration command, the first-main-shaft-motor-inverter control unit 13C-1 causes the switching device in the conversion circuit of the first-main-shaft-motor inverter 13-1 to switch to control power interconversion by the first-main-shaft-motor inverter 13-1 so as to decelerate the first main shaft motor 3-1. Consequently, AC power, which is regenerative power generated by deceleration of the first main shaft motor 3-1, is converted by the first-main-shaft-motor inverter 13-1 to DC power and the DC power is provided back to the DC link, resulting in an increase in the DC voltage value on the DC link. When the first-main-shaft-motor-inverter control unit 13C-1 receives an acceleration command as the first-main-shaft-motor acceleration/deceleration command, the first-main-shaft-motor-inverter control unit 13C-1 causes the switching device in the conversion circuit of the first-main-shaft-motor inverter 13-1 to switch to control power interconversion by the first-main-shaft-motor inverter 13-1 so as to accelerate the first main shaft motor 3-1. Consequently, the DC power on the DC link is converted by the first-main-shaft-motor inverter 13-1 to AC power and the AC power is supplied to the first main shaft motor 3-1, resulting in a drop in the DC voltage value on the DC link. In this way, the power failure backup operation is performed for the first main shaft motor 3-1 to control the DC power on the DC link, so that variations in the DC voltage value on the DC link caused by emergency stop of the feed shaft motor 2 driving the feed shaft for preventing collision of the feed shaft in power failure on the AC power supply 4 side can be suppressed and therefore occurrence of an "overvoltage alarm" and a "low-voltage alarm" can be avoided.

On the other hand, the power shutout command generated by the main-shaft-motor command unit 22 is output to the second-main-shaft-motor-inverter control unit 13C-2 through the communication bus 18. When the second-main-shaft-motor-inverter control unit 13C-2 receives the power shutoff command, the second-main-shaft-motor-inverter control unit 13C-2 stops the switching operation of the switching device in the conversion circuit of the second-main-shaft-motor inverter 13-2. This stops conversion operation for converting DC power on the DC link to AC power and shuts off drive power to the second main shaft motor 3-2. As a result, the second main shaft motor 3-2 loses power but the second main shaft connected to the second main shaft motor 3-2 rotates in concert with motion of the first main shaft driven in accordance with the power failure backup operation of the first main-shaft-motor 3-1 described above because the second main shaft is coupled with the first main shaft through the held workpiece 41. Since the second main shaft connected to the second main shaft motor 3-2 which has been powered off and in a powerless state moves in concert with the first main shaft driven in accordance with the power failure backup operation of the first main shaft motor 3-1 in this way, the workpiece 41 held by the chucker 31-1 provided on the first main shaft and the chucker 31-2 provided on the second main shaft does not twist. Thus, damage to the workpiece can be avoided even when the power failure backup operation is performed for the first main shaft motor 3-1 in the event of a power failure on the AC power supply 4 side.

Note that while the power failure backup operation is performed for the first main-shaft-motor inverter 13-1 and the power shutoff operation is performed for the second-main-shaft-motor inverter 13-2 as operations in a power failure on the AC power supply 4 side in this embodiment, the operations in a power failure may be interchanged between the first-main-shaft-motor inverter 13-1 and the second-main-shaft-motor inverter 13-2. Setting as to which of the power failure backup operation and the power shutoff operation is to be performed by each of the first-main-shaft-motor inverter 13-1 and the second-main-shaft-motor inverter 13-2 in a power failure on the AC power supply 4 side may be made beforehand in a control program in the computer numerical control unit 16, which acts as a master control unit for the first-main-shaft-motor-inverter control unit 13C-1 and the second main-shaft-motor-inverter control unit 13C-2.

The power supply backup unit 17 will now be described.

The feed-shaft-motor-inverter control unit 12C, the first-main-shaft-motor-inverter control unit 13C-1, the second-main-shaft-motor-inverter control unit 13C-2 and the computer numerical control unit 16 are supplied with power for operations from the commercial three-phase AC power supply 4 at the converter 11 through a control power line during a normal operation where there is not a power failure on the AC power supply 4 side. However, when a power failure occurs on the AC power supply 4 side of the converter 11, they may not be supplied with the power. The power supply backup unit 17 is provided for supplying power to the feed-shaft-motor-inverter control unit 12C, the first-main-shaft-motor-inverter control unit 13C-1, the second-main-shaft-motor-inverter control unit 13C-2 and the computer numerical control unit 16 for allowing the computer numerical control unit 16 to operate when the power failure detection unit 14 detects a power failure, in order to accomplish the operations of the feed-shaft-motor-inverter control unit 12C, the first-main-shaft-motor-inverter control unit 13C-1, the second-main-shaft-motor-inverter control unit 13C-2 and the computer numerical control unit 16 described above. The power supply backup unit 17 may be implemented by a capacitor or an electric power storage device, for example, that stores DC power obtained by rectifying AC power on the AC power supply 4 side, is constantly charged at an appropriate voltage, and supplies power to the feed-shaft-motor-inverter control unit 12C, the first-main-shaft-motor-inverter control unit 13C-1, the second-main-shaft-motor-inverter control unit 13C-2 and the computer numerical control unit 16 through the control power line in a power failure on the AC power supply 4 side.

Figure 2:
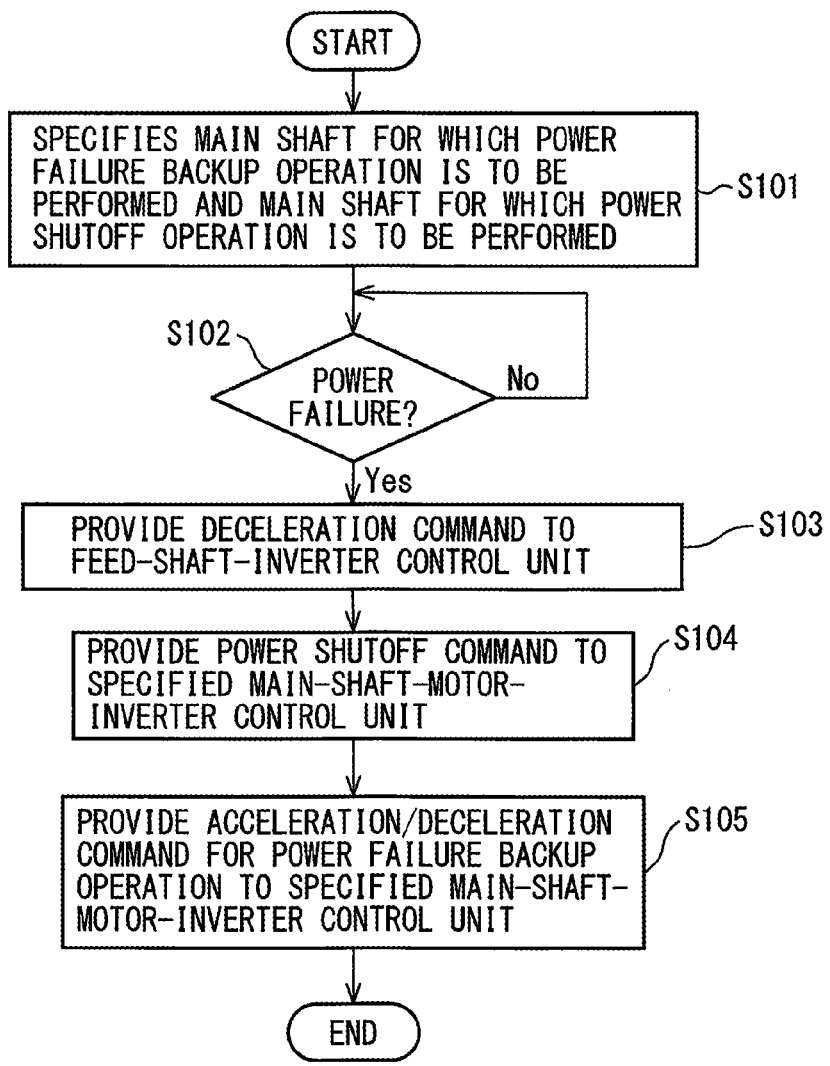
FIG. 2 is a flowchart illustrating an operation flow in the machine tool controller according to the first embodiment.

FIG. 2 is a flowchart illustrating an operation flow in the machine tool controller according to the first embodiment. An operation performed by the controller 1 when a power failure occurs on the AC power supply 4 side during machining of a workpiece 41 in the example illustrated in FIG. 1 will be described below.

First, at step S101, setting as to which of the power failure backup operation and the power shutoff operation is to be performed by each of the first-main-shaft-motor inverter 13-1 and the second-main-shaft-motor inverter 13-2 in a power failure on the AC power supply 4 side is specified in a control program in the computer numerical control unit 16, which acts as a master control unit for the first-main-shaft-motor-inverter control unit 13C-1 and the second-main-shaft-motor-inverter control unit 13C-2. In the example illustrated in FIG. 1, by way of example, the setting is specified in the control program so that the power failure backup operation is performed for the first-main-shaft-motor inverter 13-1 and the power shutoff operation is performed for the second-main-shaft-motor inverter 13-2 when a power failure occurs on the AC power supply 4 side. The setting may be made, for example, by inputting settings for the first-main-shaft-motor inverter 13-1 and the second-main-shaft-motor inverter 13-2 in the control program in the computer numerical control unit 16 through input/output devices such as a keyboard or a mouse and a display that are connected to the computer numerical control unit 16, or may be made by editing the control program on an external computer to make settings for the first-main-shaft-motor inverter 13-1 and the second-main-shaft-motor inverter 13-2 and installing the control program in the computer numerical control unit 16.

Then, at step S102, the power failure detection unit 14 in the converter 11 detects whether there is a power failure on the AC power supply 4 side of the converter 11. The power failure detection unit 14 notifies the computer numerical control unit 16 of occurrence of a power failure on the AC power supply 4 side of the converter 11 through the communication bus 18. When the power failure detection unit 14 detects a power failure at step S102, the process proceeds to step S103. On the other hand, when the power failure detection unit 14 does not detect a power failure at step S102 (i.e., in a normal operation), a motor drive command is generated that causes the first main shaft motor 3-1 which drives the first main shaft on which the chucker 31-1 is provided and the second main shaft motor 3-2 which drives the second main shaft on which the chucker 31-2 is provided to rotate in synchronization with each other so that the workpiece 41 held by the chuckers 31-1 and 31-2 does not twist. The motor drive command generated in the normal operation is provided to the first-main-shaft-motor-inverter control unit 13C-1 and the second-main-shaft-motor-inverter control unit 13C-2 through the communication bus 18.

At step S103, the feed-shaft-motor command unit 21 in the computer numerical control unit 16 generates a feed-shaft-motor deceleration command for controlling power interconversion by the feed-shaft-motor inverter 12 so as to decelerate the feed shaft motor 2. The generated feed-shaft-motor deceleration command is provided to the feed-shaft-motor-inverter control unit 12C through the communication bus 18. When the feed-shaft-motor-inverter control unit 12C receives the feed-shaft-motor deceleration command, the feed-shaft-motor-inverter control unit 12C controls the switching device in the conversion circuit of the feed-shaft-motor inverter 12 so as to cause the feed shaft motor 2 to produce torque. This causes the feed shaft motor 2 to decelerate to stop.

At step S104, the main-shaft-motor command unit 22 in the computer numerical control unit 16 generates a power shutoff command that controls power interconversion of a main-shaft-motor inverter associated with the main shaft motor specified at step S101 so that drive power to that main shaft motor is shut off. In this embodiment, the main-shaft-motor command unit 22 in the computer numerical control unit 16 generates a power shutoff command that controls power interconversion of the second-main-shaft-motor inverter 13-2 so as to shut off drive power to the second main shaft motor 3-2. The generated power shutoff command is output to the second-main-shaft-motor-inverter control unit 13C-2 through the communication bus 18. When the second-main-shaft-motor-inverter control unit 13C-2 receives the power shutoff command, the second-main-shaft-motor-inverter control unit 13C-2 stops the switching operation of the switching device in the conversion circuit of the second-main-shaft-motor inverter 13-2. This stops the power interconversion operation of the second-main-shaft-motor inverter 13-2 to shut off drive power to the second main shaft motor 3-2. As a result, the second main shaft motor 3-2 loses power.

At step S105, the main-shaft-motor command unit 22 in the computer numerical control unit 16 generates an acceleration/deceleration command for the power failure backup operation that controls the main-shaft-motor inverter associated with the main shaft motor specified at step S101 so as to perform power interconversion that accelerates or decelerates that main shaft motor in accordance with a DC voltage value detected by the voltage detection unit 15. In this embodiment, the main-shaft-motor command unit 22 in the computer numerical control unit 16 generates a first-main-shaft-motor acceleration/deceleration command that controls power interconversion of the first-main-shaft-motor inverter 13-1 so as to perform power interconversion that accelerates or decelerates the first main shaft motor 3-1 in accordance with a DC voltage value detected by the voltage detection unit 15. The generated first-main-shaft-motor acceleration/deceleration command is output to the first-main-shaft-motor-inverter control unit 13C-1 through the communication bus 18. When the first-main-shaft-motor-inverter control unit 13C-1 receives the first main-shaft-motor acceleration/deceleration command, the first-main-shaft-motor-inverter control unit 13C-1 causes the switching device in the conversion circuit of the first-main-shaft-motor inverter 13-1 to switch to control power interconversion by the first-main-shaft-motor inverter 13-1 so as to accelerate or decelerate the first main shaft motor 3-1 in accordance with a DC voltage value detected by the voltage detection unit 15. This causes the first main shaft motor 3-1 to perform the power failure backup operation. Since the second main shaft connected to the second main shaft motor 3-2 which has lost power at step S104 is coupled to the first main shaft through the held workpiece 41, the second main shaft rotates in concert with motion of the first main shaft driven in accordance with the power failure backup operation of the first main shaft motor 3-1.

Figure 3:
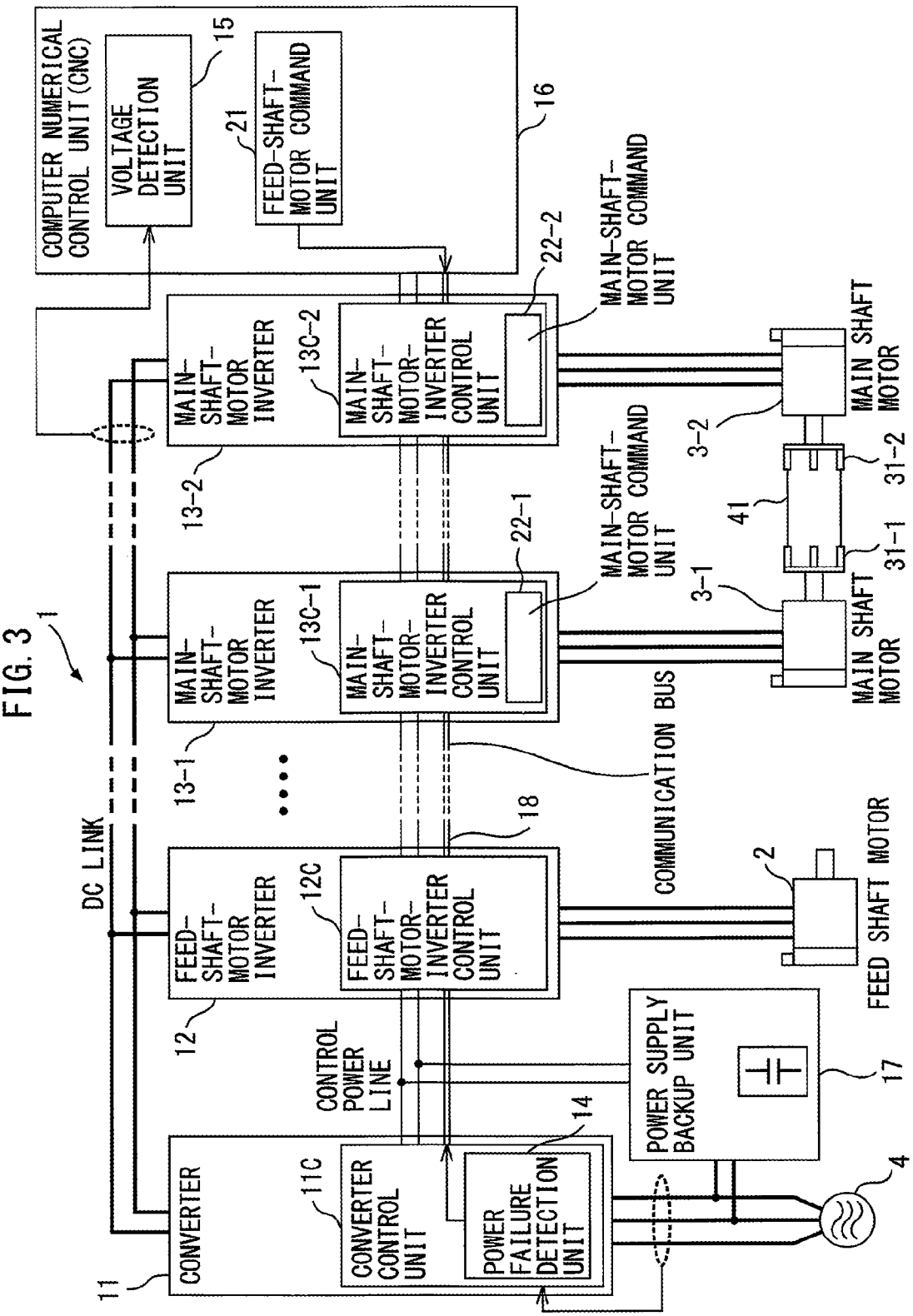
FIG. 3 is a block diagram illustrating a variation of the machine tool controller according to the first embodiment.

FIG. 3 is a block diagram illustrating a variation of the machine tool controller according to the first embodiment. While the main-shaft-motor command unit 22 in the first embodiment described with reference to FIGS. 1 and 2 is provided in the computer numerical control unit 16, a first-main-shaft-motor command unit 22-1 may be provided in the first-main-shaft-motor-inverter control unit 13C-1 and a second-main-shaft-motor command unit 22-2 may be provided in the second-main-shaft-motor-inverter control unit 13C-2 in a variation of the first embodiment as illustrated in FIG. 3. In this variation, setting as to which of the power failure backup operation and the power shutoff operation is to be performed by each of the first-main-shaft-motor inverter 13-1 and the second-main-shaft-motor inverter 13-2 in a power failure on the AC power supply 4 side is specified beforehand in a control program in the computer numerical control unit 16, which acts as a master control unit for the first-main-shaft-motor-inverter control unit 13C-1 and the second-main-shaft-motor-inverter control unit 13C-2, and the setting is sent to the first-main-shaft-motor command unit 22-1 and the second-main-shaft-motor command unit 22-2 beforehand through the communication bus 18. For example, when the power failure backup operation is specified for the first-main-shaft-motor inverter 13-1 as the operation to be performed in a power failure on the AC power supply 4 side and the power shutoff operation is specified for the second-main-shaft-motor inverter 13-2 as the operation to be performed in a power failure, the first-main-shaft-motor command unit 22-1 in the first-main-shaft-motor-inverter control unit 13C-1 generates a first-main-shaft-motor acceleration/deceleration command that controls the power interconversion by the first main-shaft-motor inverter 13-1 so as to accelerate or decelerate the first main shaft motor 3-1 in accordance with a DC voltage value detected by the voltage detection unit 15 and received through the communication bus 18 when the first-main-shaft-motor command unit 22-1 receives a notification of occurrence of a power failure on the AC power supply 4 side from the power failure detection unit 14 through the communication bus 18. The second-main-shaft-motor command unit 22-2 in the second-main-shaft-motor-inverter control unit 13C-2 generates a power shutoff command that controls power interconversion of the second-main-shaft-motor inverter 13-2 so as to shut off drive power to the second main shaft motor 3-2 when the second-main-shaft-motor command unit 22-2 receives a notification of occurrence of a power failure on the AC power supply 4 side from the power failure detection unit 14 through the communication bus 18. The operations of the other components are substantially the same as those in the first embodiment described with reference to FIG. 1 and therefore description of the operations of those components will be omitted.

Figure 4:
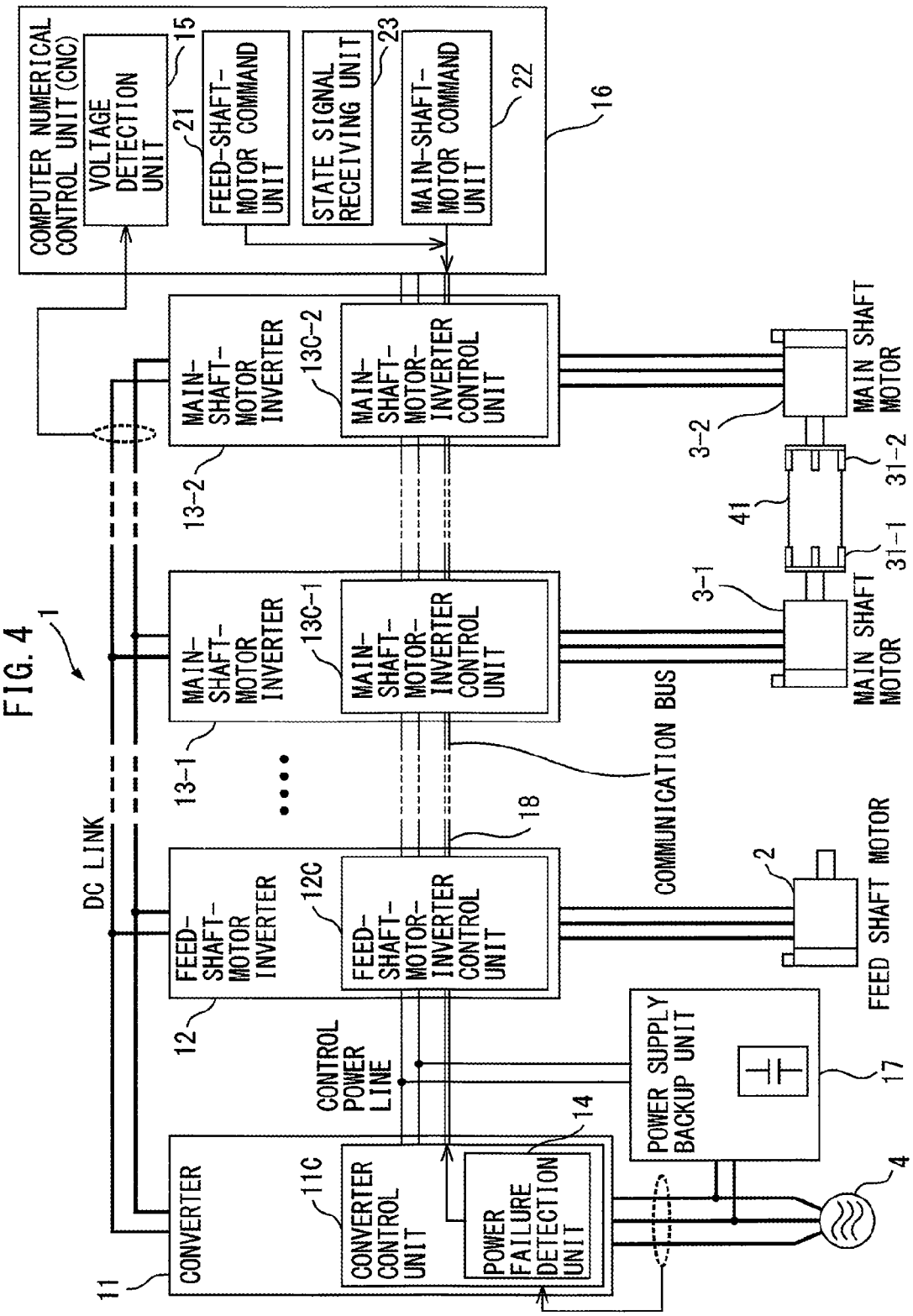
FIG. 4 is a block diagram illustrating a machine tool controller according to a second embodiment.

FIG. 4 is a block diagram illustrating a machine tool controller according to a second embodiment.

The second embodiment further includes a state signal receiving unit 23 in addition to the components of the first embodiment described above. As described above, when a workpiece 41 is held by a chucker 31-1 provided on a first main shaft and a chucker 31-2 provided on a second main shaft by being sandwiched and clamped between the chuckers 31-1 and 31-2, the first main shaft and the second main shaft are coupled together through the workpiece 41 and placed in a coupled state in which they move in concert with each other. On the other hand, when the workpiece 41 is not held by the chucker 31-1 provided on the first main shaft and the chucker 31-2 provided on the second main shaft, the first main shaft and the second main shaft are not coupled together and placed in a decoupled state in which they move independently of each other. In the second embodiment, when the first main shaft and the second main shaft are in the coupled state, the power failure backup operation is performed for a first-main-shaft-motor inverter 13-1 and the power shutoff operation is performed for a second-main-shaft-motor inverter 13-2 as the operations to be performed in a power failure on the AC power supply 4 side as in the first embodiment. When the first main shaft and the second main shaft are in the decoupled state, the power failure backup operation is performed for both of the first-main-shaft-motor inverter 13-1 and the second-main-shaft-motor inverter 13-2 as the operation to be performed in a power failure on the AC power supply 4 side. The reason why the power failure backup operation is performed for both of the first-main-shaft-motor inverter 13-1 and the second-main-shaft-motor inverter 13-2 when the first main shaft and the second main shaft are in the decoupled state in a power failure on the AC power supply 4 side in this way is that the feed shaft motor 2 can be more quickly stopped because variations in DC voltage value on the DC link caused by emergency stop of the feed shaft motor 2 can be more quickly suppressed by performing the power failure backup operation for both of the first-main-shaft-motor inverter 13-1 and the second-main-shaft-motor inverter 13-2 since the first main shaft and the second main shaft are not coupled and are able to move independently of each other.

As illustrated in FIG. 4, according to the second embodiment, the controller 1 for a machine tool including a feed shaft motor 2 that drives a feed shaft and main shaft motors 3-1 and 3-2 that drive main shafts includes a converter 11, a feed-shaft-motor inverter 12, a first-main-shaft-motor inverter 13-1, a second-main-shaft-motor inverter 13-2, a power failure detection unit 14, a voltage detection unit 15, a computer numerical control unit (CNC) 16 which acts as a control unit, a power supply backup unit 17, a communication bus 18 which acts as a communication unit, a feed-shaft-motor command unit 21, a main-shaft-motor command unit 22, and a state signal receiving unit 23. The feed-shaft-motor command unit 21, the main-shaft-motor command unit 22 and the state signal receiving unit 23 are provided in the computer numerical control unit 16 in the second embodiment.

The state signal receiving unit 23 receives a state signal indicating whether the first main shaft and the second main shaft are in a coupled state in which they are coupled together through a workpiece and move in concert with each other or in a decoupled state in which the first main shaft and the second main shaft are not coupled together and move independently of each other. The state signal receiving unit 23 may receive the state signal as follows, for example. In an operation program for the machine tool specified in the computer numerical control unit 16, a program statement that generates a state signal indicating that the first main shaft and the second main shaft are coupled together is inserted after a program statement that causes the chuckers 31-1 and 31-2 to hold a workpiece 41, so that running of the operation program generates the state signal, which is then received by the state signal receiving unit 23. Alternatively, a sensor that detects that a workpiece 41 is held may be provided at each of the chucker 31-1 provided on the first main shaft and the chucker 31-2 provided on the second main shaft and a state signal output from each of the sensors may be received by the state signal receiving unit 23.

When the main-shaft-motor command unit 22 in the computer numerical control unit 16 receives a notification that a power failure has occurred on the AC power supply 4 side from the power failure detection unit 14 through the communication bus 18 while the state signal received at the state signal receiving unit 23 indicates the coupled state, the main-shaft-motor command unit 22 generates a first main-shaft-motor acceleration/deceleration command that controls power interconversion of the first-main-shaft-motor inverter 13-1 so as to accelerate or decelerate the first main shaft motor 3-1 in accordance with a DC voltage value detected by the voltage detection unit 15 and a power shutoff command that controls power interconversion of the second-main-shaft-motor inverter 13-2 so as to shut off drive power to the second main shaft motor 3-2. In other words, when the power failure detection unit 14 detects a power failure while the state signal received at the state signal receiving unit 23 indicates a coupled state, the main-shaft-motor command unit 22 commands the first-main-shaft-motor inverter 13-1 to perform power interconversion that accelerates or decelerates the first main shaft motor 3-1 in accordance with a DC voltage value detected by the voltage detection unit 15 and commands the second-main-shaft-motor inverter 13-2 to perform power interconversion that shuts off drive power to the second main shaft motor 3-2.

On the other hand, when the main-shaft-motor command unit 22 in the computer numerical control unit 16 receives a notification that a power failure has occurred on the AC power supply 4 side from the power failure detection unit 14 through the communication bus 18 while the state signal received at the state signal receiving unit 23 indicates a decoupled state, the main-shaft-motor command unit 22 generates a first main-shaft-motor acceleration/deceleration command that controls power interconversion of the first-main-shaft-motor inverter 13-1 so as to accelerate or decelerate the first main shaft motor 3-1 in accordance with a DC voltage value detected by the voltage detection unit 15 and a second main-shaft-motor acceleration/deceleration command that controls power interconversion of the second-main-shaft-motor inverter 13-2 so as to accelerate or decelerate the second main shaft motor 3-2 in accordance with a DC voltage value detected by the voltage detection unit 15.

In this way, for the second-main-shaft-motor inverter 13-2, when the power failure detection unit 14 detects a power failure while the state signal received by the state signal receiving unit 23 indicates the coupled state, the main-shaft-motor command unit 22 in the second embodiment outputs the power shutoff command that controls power interconversion of the second-main-shaft-motor inverter 13-2 so as to shut off drive power to the second main shaft motor 3-2; when the power failure detection unit 14 detects a power failure while the state signal received by the state signal receiving unit 23 indicates the decoupled state, the main-shaft-motor command unit 22 outputs, instead of the power shutoff command output when the state signal indicates the coupled state, a second main-shaft-motor acceleration/deceleration command so that power interconversion is performed that accelerates or decelerates the second main shaft motor 3-2 in accordance with a DC voltage value detected by the voltage detection unit 15. On the other hand, for the first main-shaft-motor inverter 13-1, when the power failure detection unit 14 detects a power failure, the main-shaft-motor command unit 22 outputs a first main-shaft-motor acceleration/deceleration command that controls power interconversion of the first-main-shaft-motor inverter 13-1 so as to accelerate or decelerate the first main shaft motor 3-1 in accordance with a DC voltage value detected by the voltage detection unit 15, regardless of whether the state signal received by the state signal receiving unit 23 indicates the coupled state or the decouple state.

The second-main-shaft-motor acceleration/deceleration command, which is a command for the second-main-shaft-motor inverter 13-2, is generated based on substantially the same principle for generation of the first-main-shaft-motor acceleration/deceleration command in the first embodiment described above. Specifically, when the power failure detection unit 14 detects a power failure while the state signal received by the state signal receiving unit 23 indicates the decoupled state, the main-shaft-motor command unit 22 generates as the second main-shaft-motor acceleration/deceleration command an acceleration command that controls power interconversion of the second-main-shaft-motor inverter 13-2 so as to accelerate the second main shaft motor 3-2 when a DC voltage value detected by the voltage detection unit 15 is greater than a predetermined upper limit; when the DC voltage value detected by the voltage detection unit 15 is smaller than a predetermined lower limit, the main-shaft-motor command unit 22 generates a deceleration command that controls power interconversion of the second-main-shaft-motor inverter 13-2 so as to decelerate the second main shaft motor 3-2. The predetermined lower limit is smaller than the predetermined upper limit. Note that in an alternative variation, when a DC voltage value detected by the voltage detection unit 15 is greater than or equal to the predetermined lower limit and less than or equal to the predetermined upper limit, the main-shaft-motor command unit 22 may generate a command that controls power interconversion of the second-main-shaft-motor inverter 13-2 to maintain the current speed and may output the command to the second-main-shaft-motor-inverter control unit 13C-2 through the communication bus 18. In this case, control is performed so that the current speed of the main shaft is maintained as long as the DC voltage does not increase or drop.

When the first-main-shaft-motor-inverter control unit 13C-1 receives the first main-shaft-motor acceleration/deceleration command generated by the main-shaft-motor command unit 22 through the communication bus 18, the first-main-shaft-motor-inverter control unit 13C-1 performs the "power failure backup operation" as in the first embodiment described above. On the other hand, when the second-main-shaft-motor-inverter control unit 13C-2 receives the power shutoff command generated by the main-shaft-motor command unit 22, the second-main-shaft-motor-inverter control unit 13C-2 stops switching operation of the switching device in the conversion circuit of the second-main-shaft-motor inverter 13-2 to shut off drive power to the second main shaft motor 3-2; when the second-main-shaft-motor-inverter control unit 13C-2 receives the second main-shaft-motor acceleration/deceleration command generated by the main-shaft-motor command unit 22 through the communication bus 18, the second-main-shaft-motor-inverter control unit 13C-2 performs the "power failure backup operation".

In this way, in the second embodiment, when the first main shaft and the second main shaft are in the coupled state, the power failure backup operation is performed for the first-main-shaft-motor inverter 13-1 and the power shutoff operation is performed for the second-main-shaft-motor inverter 13-2 as the operations to be performed in a power failure on the AC power supply 4 side. When the first main shaft and the second main shaft are in the decoupled state, the power failure backup operation is performed for both of the first main shaft motor 3-1 and the second main shaft motor 3-2 as the operation to be performed in a power failure on the AC power supply 4 side. By performing the power failure backup operation for both of the first main shaft motor 3-1 and the second main shaft motor 3-2 in this way as the operation to be performed in a power failure on the AC power supply 4 side while the first main shaft and the second main shaft are in the decoupled state, variations in the DC voltage value on the DC link caused by emergency stop of the feed shaft motor 2 can be more quickly suppressed. Therefore the feed shaft motor 2 can be sopped more quickly and occurrence of an "overvoltage alarm" and a "low-voltage alarm" can be more reliably avoided.

Note that while the power failure backup operation is performed for the first-main-shaft-motor inverter 13-1 and the power shutoff operation is performed for the second-main-shaft-motor inverter 13-2 as operations in a power failure on the AC power supply 4 side in this embodiment, the operations in a power failure may be interchanged between the first-main-shaft-motor inverter 13-1 and the second-main-shaft-motor inverter 13-2. Setting as to which of the power failure backup operation and the power shutoff operation is to be performed by each of the first-main-shaft-motor inverter 13-1 and the second-main-shaft-motor inverter 13-2 in a power failure on the AC power supply 4 side may be made beforehand in a control program in the computer numerical control unit 16, which acts as a master control unit for the first-main-shaft-motor-inverter control unit 13C-1 and the second main-shaft-motor-inverter control unit 13C-2.

In the second embodiment, the components other than the components described above are substantially the same as those of the first embodiment and the description of those components will be omitted.

Figure 5:
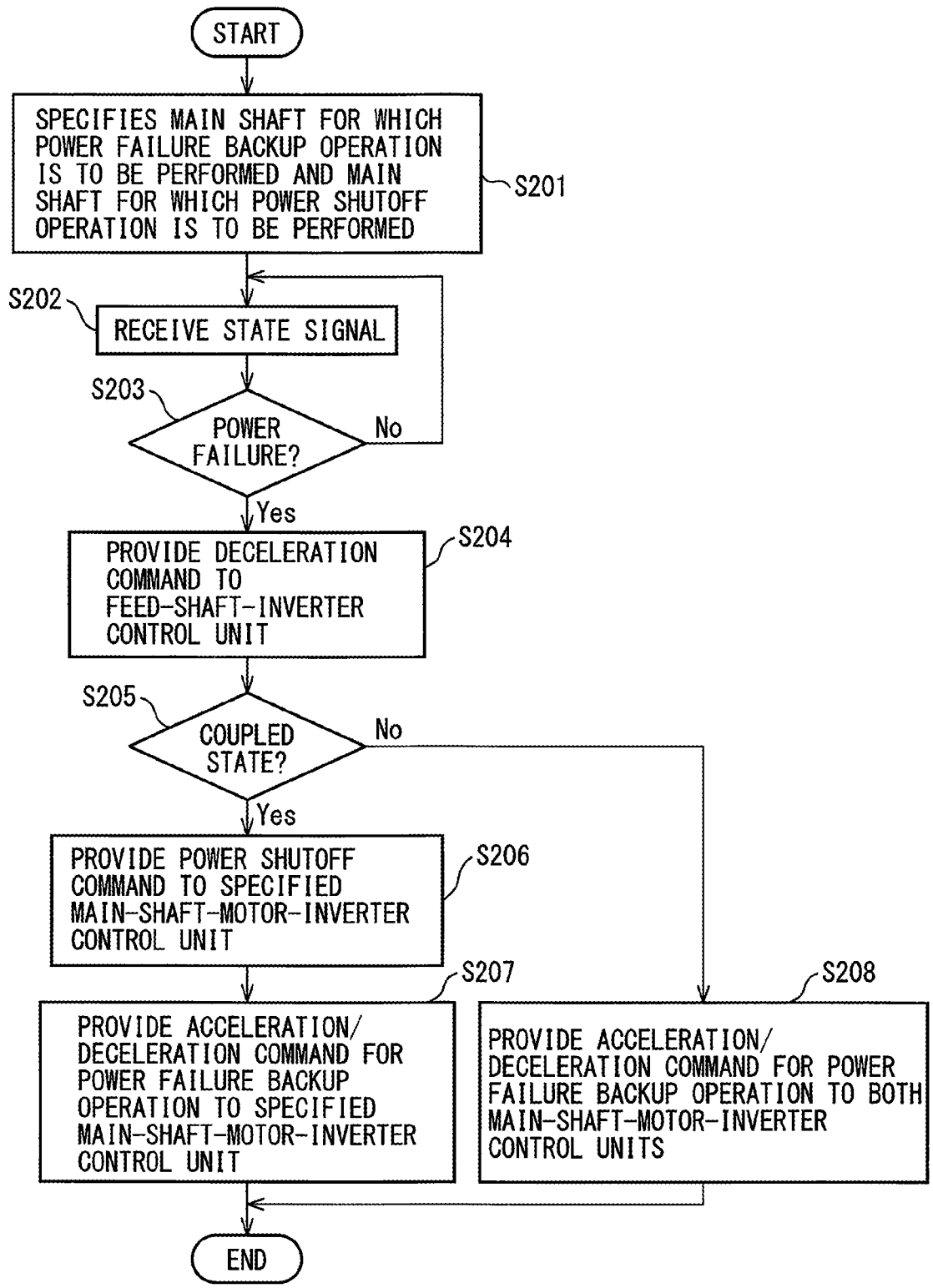
FIG. 5 is a flowchart illustrating an operation flow in the machine tool controller according to the second embodiment.

FIG. 5 is a flowchart illustrating an operation flow in a machine tool controller according to the second embodiment. An operation performed by the controller 1 when a power failure occurs on the AC power supply 4 side during machining a workpiece 41 in the example illustrated in FIG. 4 will be described below.

First, at step S201, setting as to which of the power failure backup operation and the power shutoff operation is to be performed as the operations of the first-main-shaft-motor inverter 13-1 and the second-main-shaft-motor inverter 13-2 when a power failure occurs on the AC power supply 4 side while the first main shaft and the second main shaft are coupled together is specified in a control program in the computer numerical control unit 16, which acts as a master control unit for the first-main-shaft-motor-inverter control unit 13C-1 and the second-main-shaft-motor-inverter control unit 13C-2. For example, the setting may be made by inputting settings for the first-main-shaft-motor inverter 13-1 and the second-main-shaft-motor inverter 13-2 in the control program in the computer numerical control unit 16 through input/output devices such as a keyboard or a mouse and a display that are connected to the computer numerical control unit 16, or may be made by directly editing the control program on an external computer to make settings for the first-main-shaft-motor inverter 13-1 and the second-main-shaft-motor inverter 13-2 and installing the control program in the computer numerical control unit 16. In the example illustrated in FIG. 4, by way of example, the setting is specified in the control program so that the power failure backup operation is performed for the first-main-shaft-motor inverter 13-1 and the power shutoff operation is performed for the second-main-shaft-motor inverter 13-2 as the operations to be performed when a power failure occurs on the AC power supply 4 side.

Then, at step S202, the state signal receiving unit 23 receives a state signal indicating whether the first main shaft and the second main shaft are in a coupled state where the first main shaft and the second main shaft are coupled together through a workpiece and move in concert with each other or in a decoupled sate where the first main shaft and the second main shaft are not coupled together and move independently of each other.

At step S203, the power failure detection unit 14 in the converter 11 detects whether there is a power failure on the AC power supply 4 side of the converter 11. The power failure detection unit 14 notifies the computer numerical control unit 16 through the communication bus 18 that a power failure has occurred on the AC power supply 4 side of the converter 11. When the power failure detection unit 14 detects a power failure at step 203, the process proceeds to step S204. On the other hand, when the power failure detection unit 14 does not detect a power failure at step S203 (i.e., in a normal operation), a motor drive command is generated that causes the first main shaft motor 3-1 driving the first main shaft on which the chucker 31-1 is provided and the second main shaft motor 3-2 driving the second main shaft on which the chucker 31-2 is provided to rotate in synchronization with each other so that a workpiece 41 held by the chuckers 31-1 and 31-2 does not twist. The motor drive command generated in the normal operation is provided to the first main-shaft-motor-inverter control unit 13C-1 and the second-main-shaft-motor-inverter control unit 13C-2 through the communication bus 18.

At step S204, the feed-shaft-motor command unit 21 in the computer numerical control unit 16 generates a feed-shaft-motor deceleration command for controlling power interconversion by the feed-shaft-motor inverter 12 so as to decelerate the feed shaft motor 2. The generated feed-shaft-motor deceleration command is provided to the feed-shaft-motor-inverter control unit 12C through the communication bus 18. When the feed-shaft-motor-inverter control unit 12C receives the feed-shaft-motor deceleration command, the feed-shaft-motor-inverter control unit 12C controls the switching device in the conversion circuit of the feed-shaft-motor inverter 12 so as to cause the feed shaft motor 2 to produce deceleration torque. This causes the feed shaft motor 2 to decelerate to stop.

At step S205, the computer numerical control unit 16 determines whether the state signal received by the state signal receiving unit 23 indicates that the first main shaft and the second main shaft is in a coupled sate or a decoupled state. When the state signal indicates that they are in a coupled state, the process proceeds to step S206; when the signal indicates that they are in a decoupled state, the process proceeds to step S208.

At step S206, the main-shaft-motor command unit 22 in the computer numerical control unit 16 generates a power shutoff command that controls power interconversion of the main-shaft-motor inverter associated with the main shaft motor that is specified at step S201 to shut off drive power to that main shaft motor. In this embodiment, the main-shaft-motor command unit 22 in the computer numerical control unit 16 generates a power shutoff command that controls power interconversion of the second-main-shaft-motor inverter 13-2 so as to shut off drive power to the second main shaft motor 3-2. The generated power shutoff command is output to the second-main-shaft-motor-inverter control unit 13C-2 through the communication bus 18. When the second-main-shaft-motor-inverter control unit 13C-2 receives the power shutoff command, the second-main-shaft-motor-inverter control unit 13C-2 stops switching operation of the switching device in the conversion circuit of the second-main-shaft-motor inverter 13-2. This stops the power interconversion operation of the second-main-shaft-motor inverter 13-2 to shut off drive power to the second main shaft motor 3-2. As a result, the second main shaft motor 3-2 loses power.

At step S207, the main-shaft-motor command unit 22 in the computer numerical control unit 16 generates an acceleration/deceleration command for the power failure backup operation that controls the main-shaft-motor inverter associated with the main shaft motor specified at step S201 so as to perform power interconversion that accelerates or decelerates that main shaft motor in accordance with a DC voltage value detected by the voltage detection unit 15. In this embodiment, the main-shaft-motor command unit 22 in the computer numerical control unit 16 generates a first-main-shaft-motor acceleration/deceleration command that controls power interconversion of the first-main-shaft-motor inverter 13-1 so as to perform power interconversion that accelerates or decelerates the first main shaft motor 3-1 in accordance with a DC voltage value detected by the voltage detection unit 15. The generated first-main-shaft-motor acceleration/deceleration command is output to the first-main-shaft-motor-inverter control unit 13C-1 through the communication bus 18. When the first-main-shaft-motor-inverter control unit 13C-1 receives the first main-shaft-motor acceleration/deceleration command, the first-main-shaft-motor-inverter control unit 13C-1 causes the switching device in the conversion circuit of the first-main-shaft-motor inverter 13-1 to switch to control power interconversion by the first-main-shaft-motor inverter 13-1 so as to accelerate or decelerate the first main shaft motor 3-1 in accordance with a DC voltage value detected by the voltage detection unit 15. This causes the first main shaft motor 3-1 to perform the power failure backup operation. Since the second main shaft connected to the second main shaft motor 3-2 which has lost power at step S206 is coupled to the first main shaft through the held workpiece 41, the second main shaft rotates in concert with motion of the first main shaft driven in accordance with the power failure backup operation of the first main shaft motor 3-1.

On the other hand, at step S208, the main-shaft-motor command unit 22 in the computer numerical control unit 16 generates a first main-shaft-motor acceleration/deceleration command that controls power interconversion of the first-main-shaft-motor inverter 13-1 and a second main-shaft-motor acceleration/deceleration command that controls power interconversion of the second-main-shaft-motor inverter 13-2 so as to perform power interconversion that accelerates or decelerates the main shaft motor specified at the step S201 in accordance with a DC voltage value detected by the voltage detection unit 15. The generated first main-shaft-motor acceleration/deceleration command is output to the first main-shaft-motor-inverter control unit 13C-1 through the communication bus 18 and the generated second main-shaft-motor acceleration/deceleration command is output to the second-main-shaft-motor-inverter control unit 13C-2 through the communication bus 18. When the first-main-shaft-motor-inverter control unit 13C-1 receives the first main-shaft-motor acceleration/deceleration command, the first-main-shaft-motor-inverter control unit 13C-1 causes the switching device in the conversion circuit of the first-main-shaft-motor inverter 13-1 to switch to control power interconversion by the first-main-shaft-motor inverter 13-1 so as to accelerate or decelerate the first main shaft motor 3-1 in accordance with a DC voltage value detected by the voltage detection unit 15. Similarly, when the second-main-shaft-motor-inverter control unit 13C-2 receives the second main-shaft-motor acceleration/deceleration command, the second-main-shaft-motor-inverter control unit 13C-2 causes the switching device in the conversion circuit of the second-main-shaft-motor inverter 13-2 to switch to control power interconversion of the second-main-shaft-motor inverter 13-2 so as to accelerate or decelerate the second main shaft motor 3-2 in accordance with a DC voltage value detected by the voltage detection unit 15. Thus, both of the first main shaft motor 3-1 and the second main shaft motor 3-2 perform the power failure backup operation.

Since the first main shaft and the second main shaft are in the decoupled state, a twist of the workpiece 41 would not occur. Since variations in the DC voltage value on the DC link caused by emergency stop of the feed shaft motor 2 can be more quickly suppressed by performing the power failure backup operation for both of the first-main-shaft-motor inverter 13-1 and the second-main-shaft-motor inverter 13-2 when a power failure occurs on the AC power supply 4 side, the feed shaft motor 2 can be more quickly stopped.

Figure 6:
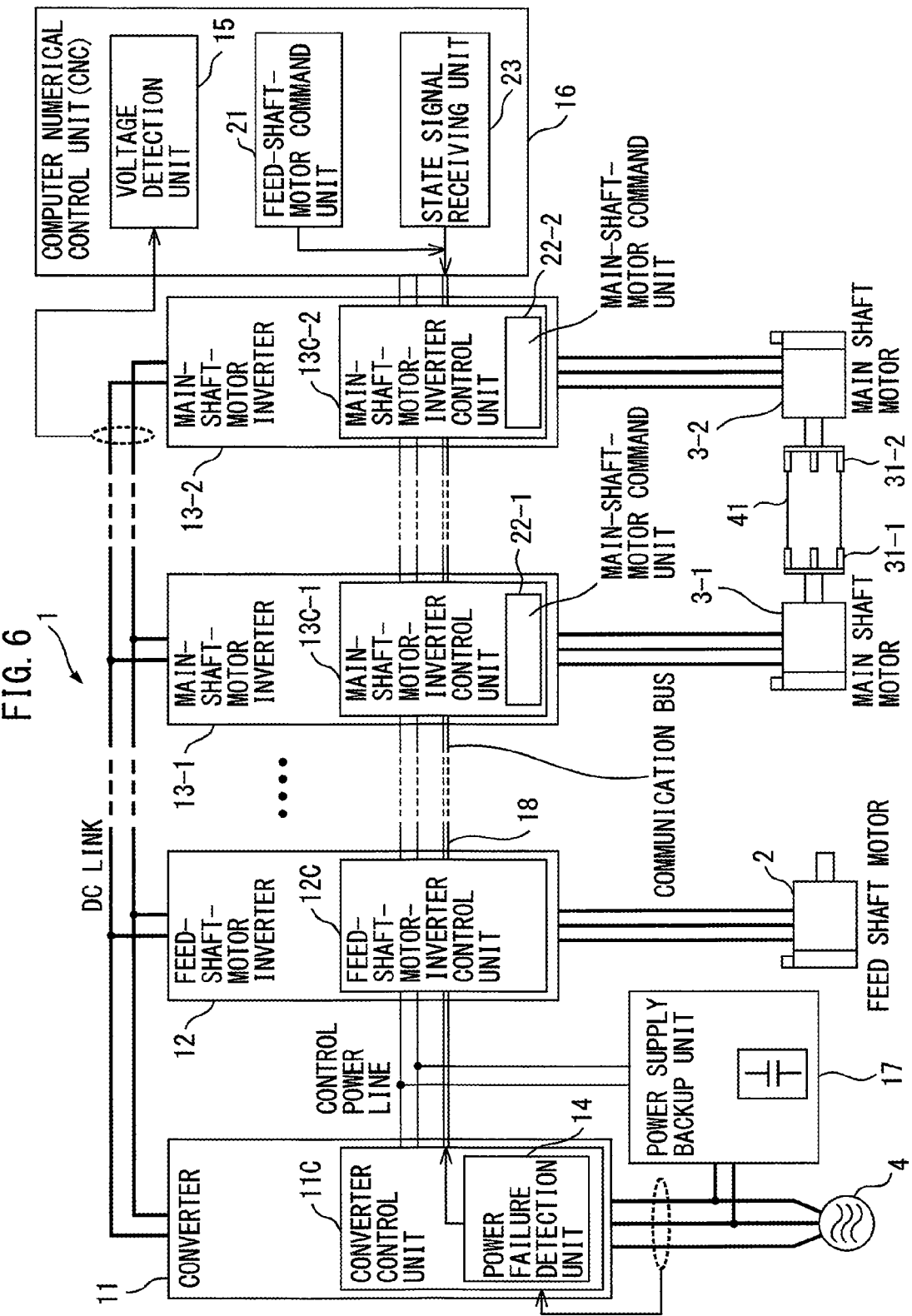
FIG. 6 is a block diagram illustrating a variation of the machine tool controller according to the second embodiment.

FIG. 6 is a block diagram illustrating a variation of a machine tool controller according to the second embodiment. While the main-shaft-motor command unit 22 in the second embodiment described with reference to FIGS. 4 and 5 is provided in the computer numerical control unit 16, a first-main-shaft-motor command unit 22-1 may be provided in the first-main-shaft-motor-inverter control unit 13C-1 and a second-main-shaft motor command unit 22-2 may be provided in the second-main-shaft-motor-inverter control unit 13C-2 in a variation of the second embodiment as illustrated in FIG. 6 as in the variation of the first embodiment described above. In this case, setting as to which of the power failure backup operation and the power shutoff operation is to be performed for each of the first-main-shaft-motor inverter 13-1 and the second-main-shaft-motor inverter 13-2 when a power failure occurs on the AC power supply 4 side while the first main shaft and the second main shaft are in the coupled state is beforehand specified in a control program in the computer numerical control unit 16, which acts as a master control unit for the first-main-shaft-motor-inverter control unit 13C-1 and the second-main-shaft-motor-inverter control unit 13C-2, and the setting is provided to the first-main-shaft-motor command unit 22-1 and the second-main-shaft-motor command unit 22-2 through the communication bus 18. In addition, each time the state signal receiving unit 23 receives a state signal, the state signal is transferred to the first-main-shaft-motor command unit 22-1 and the second-main-shaft-motor command unit 22-2 through the communication bus 18.

Assuming for example that the power failure backup operation is specified for the first-main-shaft-motor inverter 13-1 and the power shutoff operation is specified for the second-main-shaft-motor inverter 13-2 as operations to be performed when a power failure occurs on the AC power supply 4 side while the first main shaft and the second main shaft are coupled together, operations of the variation of the machine tool controller according to the second embodiment will be described below.

The first-main-shaft-motor command unit 22-1 in the first-main-shaft-motor-inverter control unit 13C-1 generates a first main-shaft-motor acceleration/deceleration command that controls power interconversion by the first-main-shaft-motor inverter 13-1 so as to accelerate or decelerate the first main shaft motor 3-1 in accordance with a DC voltage value detected by the voltage detection unit 15 and received through the communication bus 18 when the first-main-shaft-motor command unit 22-1 receives a notification indicting that a power failure has occurred on the AC power supply 4 side from the power failure detection unit 14 through the communication bus 18, regardless of whether a state signal received through the communication bus 18 indicates the coupled state or the decoupled state.

When the second-main-shaft-motor command unit 22-2 in the second-main-shaft-motor-inverter control unit 13C-2 receives a notification of a power failure on the AC power supply 4 side while the state signal received through the communication bus 18 indicates the coupled state from the power failure detection unit 14 through the communication bus 18, the second-main-shaft-motor command unit 22-2 generates a power shutoff command that controls power interconversion of the second-main-shaft-motor inverter 13-2 so as to shut off drive power to the second main shaft motor 3-2. On the other hand, when the second-main-shaft-motor command unit 22-2 in the second-main-shaft-motor-inverter control unit 13C-2 receives a notification of a power failure on the AC power supply 4 side while the state signal received through the communication bus 18 indicates the decoupled state from the power failure detection unit 14 through the communication bus 18, the second-main-shaft-motor command unit 22-2 generates a second main-shaft-motor acceleration/deceleration command that controls power interconversion by the second main-shaft-motor inverter 13-2 so as to accelerate or decelerate the second main shaft motor 3-2 in accordance with a DC voltage value detected by the voltage detection unit 15 and received through the communication bus 18.

Operations of the components of the variation of the second embodiment other than the components described above are substantially the same as the operations of those components of the second embodiment described with reference to FIG. 4 and therefore the description of the operations of those components will be omitted.

Note that in other variations of the first and second embodiments, a feed-shaft-motor command unit 21 may be provided in the feed-shaft-motor-inverter control unit 12C. In this case, when the feed-shaft-motor command unit 21 in the feed-shaft-motor-inverter control unit 12C receives a notification that a power failure has occurred on the AC power supply 4 side from the power failure detection unit 14 through the communication bus 18, the feed-shaft-motor command unit 21 generates a feed-shaft-motor deceleration command for controlling power interconversion by the feed-shaft-motor inverter 12 so as to decelerate the feed shaft motor 2.

The present invention is applicable to a machine tool controller that converts AC power supplied from an AC power supply side to DC power, outputs the DC power, then converts the DC power to AC power for motor driving, supplies the AC power to a feed shaft motor and main shaft motors, and drives the motors of a machine tool that includes the feed shaft motor which drives a feed shaft and the main shaft motors which drive main shafts, two of the main shafts moving in synchronization with each other through a workpiece held by the main shafts.

According to the present invention, when a power failure occurs on an AC power supply side in a machine tool including a feed shaft motor driving a feed shaft and main shaft motors driving main shafts that hold a workpiece, the feed shaft motor can be reliably and quickly stopped and damage to the workpiece held by the two of a plurality of main shafts can be avoided. Since the feed shaft motor can be reliably and quickly stopped when a power failure occurs on the AC power supply side, a collision of the feed shaft due to the power failure on the AC power supply side can be avoided as well.

According to the first embodiment, when a power failure occurs on an AC power supply side in a machine tool including a first main shaft and a second main shaft that hold a workpiece, a power failure backup operation is performed for a first main shaft motor that drives the first main shaft and power to a second main shaft motor that drives the second main shaft is shut off, so that the second main shaft connected to the second main shaft motor which has been powered off and is in a powerless state moves in concert with the first main shaft which is driven in accordance with the power failure backup operation of the first main shaft motor. Accordingly, the workpiece held by the first main shaft and the second main shaft does not twist. Furthermore, the power failure backup operation for the first main shaft motor can suppress variations in the DC voltage value on the DC link caused by emergency stop of the feed shaft motor driving the feed shaft for preventing a collision of the feed shaft. Accordingly, occurrence of an "overvoltage alarm" and a "low-voltage alarm" can be avoided.

According to the second embodiment, when a power failure occurs on the AC power supply side while the first main shaft and the second main shaft are in the coupled state, the power failure backup operation is performed for the first main shaft motor and the power to the second main shaft motor is shut off; when a power failure occurs on the AC power supply side while the first main shaft and the second main shaft are in the decoupled state, the power failure backup operation is performed for both of the first main shaft motor and the second main shaft motor. Accordingly, variations in the DC voltage value on the DC link that occur at emergency stop of the feed shaft motor 2 driving the feed shaft for preventing a collision of the feed shaft can be more quickly suppressed and therefore the feed shaft motor 2 can be more quickly stopped, thereby avoiding occurrence of an "overvoltage alarm" and a "low-voltage alarm".

What is claimed is:

1. A controller for a machine tool including a feed shaft motor driving a feed shaft, a first main shaft motor driving a first main shaft, and a second main shaft motor driving a second main shaft, the controller comprising:
    a converter interconverting AC power on an AC power supply side and DC power on a DC link which is a DC side;
    a feed-shaft-motor inverter connected to the DC link, the feed-shaft-motor inverter interconverting DC power on the DC link and AC power which is drive power or regenerative power of the feed shaft motor;
    a first-main-shaft-motor inverter and a second-main-shaft-motor inverter connected to the DC link, the first-main-shaft-motor inverter and the second-main-shaft-motor inverter interconverting DC power on the DC link and AC power which is drive power or regenerative power for each of the first main shaft motor and the second main shaft motor;
    a power failure detection unit detecting whether or not there is a power failure on the AC power supply side of the converter;
    a voltage detection unit detecting a DC voltage value on the DC link;
    a feed-shaft-motor command unit outputting a command controlling power interconversion of the feed-shaft-motor inverter so as to decelerate the feed shaft motor when the feed-shaft-motor command unit receives a notification of occurrence of a power failure from the power failure detection unit; and
    a main-shaft-motor command unit outputting a first-main-shaft-motor acceleration/deceleration command controlling power interconversion of the first-main-shaft-motor inverter so as to accelerate or decelerate the first main shaft motor in accordance with a DC voltage value detected by the voltage detection unit and a power shutoff command controlling power interconversion of the second-main-shaft-motor inverter so as to shut off drive power to the second main shaft motor, when the main-shaft-motor command unit receives the notification of occurrence of a power failure from the power failure detection unit,
    wherein
    when the power failure detection unit detects a power failure, the main-shaft-motor command unit is configured to output, as the first-main-shaft-motor acceleration/deceleration command, an acceleration command that controls power interconversion of the first-main-shaft-motor inverter so as to accelerate the first main shaft motor when the DC voltage value detected by the voltage detection unit is greater than a predetermined upper limit, and
    the power shutoff command is configured to stop a switching operation of a switching device in a conversion circuit of the second-main-shaft-motor inverter.

2. The controller for a machine tool according to claim 1, the controller further comprising a state signal receiving unit receiving a state signal indicating that the first main shaft and the second main shaft are in a coupled state in which the first main shaft and the second main shaft are coupled together and move in concert with each other or are in a decoupled state in which the first main shaft and the second main shaft and move independently of each other;
    wherein
    when the power failure detection unit detects a power failure while the state signal indicates the coupled state, the main-shaft-motor command unit outputs the first-main-shaft-motor acceleration/deceleration command to the first-main-shaft-motor inverter and the power shutoff command to the second-main-shaft-motor inverter, and
    when the power failure detection unit detects a power failure while the state signal indicates the decoupled state, the main-shaft-motor command unit outputs the first-main-shaft motor acceleration/deceleration command to the first-main-shaft-motor inverter and a second-main-shaft-motor acceleration/deceleration command, instead of the power shutoff command, to the second-main-shaft-motor inverter, the second-main-shaft-motor acceleration/deceleration command controlling power interconversion of the second-main-shaft-motor inverter so as to accelerate or decelerate the second main shaft motor in accordance with a DC voltage value detected by the voltage detection unit.

3. The controller for a machine tool according to claim 1, wherein, when the power failure detection unit detects a power failure, the main-shaft-motor command unit outputs, as the first-main-shaft-motor acceleration/deceleration command, a deceleration command that controls power interconversion of the first main-shaft-motor inverter so as to decelerate the first main shaft motor when the DC voltage value detected by the voltage detection unit is smaller than a predetermined lower limit, the predetermined lower limit being smaller than the predetermined upper limit.

4. The controller for a machine tool according to claim 2, wherein when the power failure detection unit detects a power failure while the state signal indicates the decoupled state, the main-shaft-motor command unit outputs, as the second-main-shaft-motor acceleration/deceleration command, an acceleration command that controls power interconversion of the second-main-shaft-motor inverter so as to accelerate the second main shaft motor when a DC voltage value detected by the voltage detection unit is greater than a predetermined upper value and, outputs, as the second-main-shaft-motor acceleration/deceleration command, a deceleration command that controls power interconversion of the second-main-shaft-motor inverter so as to decelerate the second main shaft motor when the DC voltage value detected by the voltage detection unit is smaller than a predetermined lower value, the predetermined lower value being smaller than the predetermined upper value.

5. The controller for a machine tool according to claim 1, wherein the main-shaft-motor command unit is provided in a computer numerical control unit outputting operation commands to the feed shaft motor, the first main shaft motor and the second main shaft motor.

6. The controller for a machine tool according to claim 1, wherein the main-shaft-motor command unit is separately provided in a first-main-shaft-motor-inverter control unit controlling power interconversion of the first main-shaft-motor inverter and in a second-main-shaft-motor-inverter control unit controlling power interconversion of the second main-shaft-motor inverter.

7. The controller for a machine tool according to claim 2, wherein the state signal receiving unit is provided in a computer numerical control unit outputting operation commands to the feed shaft motor, the first main shaft motor and the second main shaft motor.

8. The controller for a machine tool according to claim 1, the controller further comprising a power supply backup unit supplying drive power to a feed-shaft-motor-inverter control unit controlling power interconversion of the feed-shaft-motor inverter, a first-main-shaft-motor-inverter control unit controlling power interconversion of the first-main-shaft-motor inverter, and a second-main-shaft-motor-inverter control unit controlling power interconversion of the second main-shaft-motor inverter when the power failure detection unit detects a power failure.

9. A controller for a machine tool including a feed shaft motor driving a feed shaft, a first main shaft motor driving a first main shaft, and a second main shaft motor driving a second main shaft, the controller comprising:
   a converter interconverting AC power on an AC power supply side and DC power on a DC link which is a DC side;
   a feed-shaft-motor inverter connected to the DC link, the feed-shaft-motor inverter interconverting DC power on the DC link and AC power which is drive power or regenerative power of the feed shaft motor;
   a first-main-shaft-motor inverter and a second-main-shaft-motor inverter connected to the DC link, the first-main-shaft-motor inverter and the second-main-shaft-motor inverter interconverting DC power on the DC link and AC power which is drive power or regenerative power for each of the first main shaft motor and the second main shaft motor;
   a power failure detection unit detecting whether or not there is a power failure on the AC power supply side of the converter;
   a voltage detection unit detecting a DC voltage value on the DC link;
   a feed-shaft-motor command unit outputting a command controlling power interconversion of the feed-shaft-motor inverter so as to decelerate the feed shaft motor when the feed-shaft-motor command unit receives a notification of occurrence of a power failure from the power failure detection unit;
   a main-shaft-motor command unit outputting a first-main-shaft-motor acceleration/deceleration command controlling power interconversion of the first-main-shaft-motor inverter so as to accelerate or decelerate the first main shaft motor in accordance with a DC voltage value detected by the voltage detection unit and a power shutoff command controlling power interconversion of the second-main-shaft-motor inverter so as to shut off drive power to the second main shaft motor, when the main-shaft-motor command unit receives the notification of occurrence of a power failure from the power failure detection unit; and
   a state signal receiving unit receiving a state signal indicating that the first main shaft and the second main shaft are in a coupled state in which the first main shaft and the second main shaft are coupled together and move in concert with each other or are in a decoupled state in which the first main shaft and the second main shaft and move independently of each other;
   wherein
   when the power failure detection unit detects a power failure while the state signal indicates the coupled state, the main-shaft-motor command unit outputs the first-main-shaft-motor acceleration/deceleration command to the first-main-shaft-motor inverter and the power shutoff command to the second-main-shaft-motor inverter, and
   when the power failure detection unit detects a power failure while the state signal indicates the decoupled state, the main-shaft-motor command unit outputs the first-main-shaft motor acceleration/deceleration command to the first-main-shaft-motor inverter and a second-main-shaft-motor acceleration/deceleration command, instead of the power shutoff command, to the second-main-shaft-motor inverter, the second-main-shaft-motor acceleration/deceleration command controlling power interconversion of the second-main-shaft-motor inverter so as to accelerate or decelerate the second main shaft motor in accordance with a DC voltage value detected by the voltage detection unit.

10. The controller for a machine tool according to claim 9, wherein when the power failure detection unit detects a power failure while the state signal indicates the decoupled state, the main-shaft-motor command unit outputs, as the second-main-shaft-motor acceleration/deceleration command, an acceleration command that controls power interconversion of the second-main-shaft-motor inverter so as to accelerate the second main shaft motor when a DC voltage value detected by the voltage detection unit is greater than a predetermined upper limit and, outputs, as the second-main-shaft-motor acceleration/deceleration command, a deceleration command that controls power interconversion of the second-main-shaft-motor inverter so as to decelerate the second main shaft motor when the DC voltage value detected by the voltage detection unit is smaller than a predetermined lower limit, the predetermined lower limit being smaller than the predetermined upper limit.

11. The controller for a machine tool according to claim 9, wherein the state signal receiving unit is provided in a computer numerical control unit outputting operation commands to the feed shaft motor, the first main shaft motor and the second main shaft motor.

12. A controller for a machine tool including a feed shaft motor driving a feed shaft, a first main shaft motor driving a first main shaft, and a second main shaft motor driving a second main shaft, the controller comprising:
   a converter interconverting AC power on an AC power supply side and DC power on a DC link which is a DC side;
   a feed-shaft-motor inverter connected to the DC link, the feed-shaft-motor inverter interconverting DC power on the DC link and AC power which is drive power or regenerative power of the feed shaft motor;
   a first-main-shaft-motor inverter and a second-main-shaft-motor inverter connected to the DC link, the first-main-shaft-motor inverter and the second-main-shaft-motor inverter interconverting DC power on the DC link and AC power which is drive power or regenerative power for each of the first main shaft motor and the second main shaft motor;
   a power failure detection unit detecting whether or not there is a power failure on the AC power supply side of the converter;
   a voltage detection unit detecting a DC voltage value on the DC link;
   a feed-shaft-motor command unit outputting a command controlling power interconversion of the feed-shaft-motor inverter so as to decelerate the feed shaft motor when the feed-shaft-motor command unit receives a notification of occurrence of a power failure from the power failure detection unit; and a main-shaft-motor command unit outputting a first-main-shaft-motor acceleration/deceleration command controlling power interconversion of the first-main-shaft-motor inverter so as to accelerate or decelerate the first main shaft motor in accordance with a DC voltage value detected by the voltage detection unit and a power shut-off command controlling power interconversion of the second-main-shaft-motor inverter so as to shut off drive power to the second main shaft motor, when the main-shaft-motor command unit receives the notification of occurrence of a power failure from the power failure detection unit, wherein when the power failure detection unit detects a power failure, the main-shaft-motor command unit outputs, as the first-main-shaft-motor acceleration/deceleration command, an acceleration command that controls power interconversion of the first-main-shaft-motor inverter so as to accelerate the first main shaft motor when a DC voltage value detected by the voltage detection unit is greater than a predetermined upper limit and, outputs, as the first-main-shaft-motor acceleration/deceleration command, a deceleration command that controls power interconversion of the first main-shaft-motor inverter so as to decelerate the first main shaft motor when the DC voltage value detected by the voltage detection unit is smaller than a predetermined lower limit, the predetermined lower limit being smaller than the predetermined upper limit.

* * * * *